US005651558A

United States Patent [19]

Boyce

[11] Patent Number: 5,651,558

[45] Date of Patent: Jul. 29, 1997

[54] WHEELCHAIR ATTACHMENT

[76] Inventor: James A. Boyce, 343 S. Harris, Saline, Mich. 48167

[21] Appl. No.: 455,229

[22] Filed: May 31, 1995

[51] Int. Cl.$^{6}$ .......... B62J 39/00

[52] U.S. Cl. .......... 280/304.1; 15/50.1; 297/DIG. 4

[58] Field of Search .......... 280/304.1, 250.1; 297/DIG. 4; 248/912, 225.31, 229, 231.5; 15/52, 50.1, 50.2, 50.3, 78, 79.1, 79.2, 87, 246

[56] References Cited

U.S. PATENT DOCUMENTS

| | | | |
|---|---|---|---|
| 368,052 | 8/1887 | Batts | 15/50.2 |
| 3,083,967 | 4/1963 | Steel | 280/304.1 X |
| 3,999,778 | 12/1976 | Markiel | 280/304.1 |
| 4,163,302 | 8/1979 | Iaboni | 15/50.1 |
| 4,305,601 | 12/1981 | Berge | 280/304.1 |
| 4,316,616 | 2/1982 | Boivin | 280/304.1 |
| 4,368,898 | 1/1983 | Lay | 280/304.1 |
| 4,470,598 | 9/1984 | Steele et al. | 280/304.1 X |
| 4,506,930 | 3/1985 | Lambert | 297/423.11 |
| 5,009,442 | 4/1991 | Schneider | 280/304.1 |
| 5,118,127 | 6/1992 | Partington | 280/304.1 X |
| 5,246,240 | 9/1993 | Romich et al. | 280/304.1 |
| 5,470,093 | 11/1995 | Kiser | 280/304.1 |
| 5,513,413 | 5/1996 | Myers | 15/50.1 |

FOREIGN PATENT DOCUMENTS

| | | | |
|---|---|---|---|
| 0184492 | 6/1983 | European Pat. Off. . | |
| 0127929 | 9/1984 | European Pat. Off. | 280/304.1 |

*Primary Examiner*—Anne Marie Boehler

*Attorney, Agent, or Firm*—Young & Basile, PC

[57] ABSTRACT

Attachments mountable on a wheelchair movably connect an article, device or machine to the wheelchair and enable the occupant of the wheelchair to manipulate the article, device or machine. The attachments are connectible to at least the front vertical posts of a wheelchair and include rotatable and extensible portions as well as resilient members which enable unidirectional movement of the article with respect to the wheelchair under occupant manipulation.

10 Claims, 4 Drawing Sheets

WHEELCHAIR ATTACHMENT

BACKGROUND OF THE INVENTION

1. Field of the Invention

The present invention relates, in general, to wheelchairs and, specifically, to attachments to wheelchairs which enable a user to perform activities while seated in the wheelchair.

2. Background Description

Various devices have been provided for attachment to or use with wheelchairs that enable a specialized use of the wheelchair by the occupant. Such devices include lifting apparatus which enable the occupant of a wheelchair to move between a seated position in the wheelchair and a standing position in an upright support located in front of the wheelchair.

Certain other attachments have been coupled to a wheelchair to enable a user to perform various activities. One such attachment includes coupling members which enable a conventional grocery store shopping cart to be attached to the front vertical posts of a wheelchair to enable a user seated in the wheelchair to move the shopping cart about a store simply by rotating the wheels of the wheelchair in a conventional manner.

From a physiological standpoint, it is desirable to enable the occupant of a wheelchair to occasionally stand up as well as to perform various activities while seated in the wheelchair to exercise the occupant's leg and arm muscles. From a psychological standpoint, it is also desirable to provide the occupant of a wheelchair with the ability to perform useful tasks while seated in the wheelchair.

In addition to leg impairment, occupants of wheelchairs frequently have other disabilities in varying degrees which limit the use of one or both arms and/or hands. Such disabilities make it difficult for the occupant of a wheelchair to hold an object necessary to perform an activity while seated in the wheelchair.

Thus, it would be desirable to provide various attachments for a wheelchair which enable articles, devices or machines to be easily attached to the wheelchair to enable the occupant to perform various activities using such articles, devices or machines. It would also be desirable to provide various attachments for a wheelchair which can be easily attached to and removed from the wheelchair and which are capable of securely holding various articles, devices or machines to enable the occupant of a wheelchair to manipulate such articles, devices or machines according to their intended purpose in performing various activities.

SUMMARY OF THE INVENTION

The present invention is attachments for a wheelchair which enables various articles, devices or machines to be releasibly attached to the wheelchair in a manner which enables the occupant of the wheelchair to manipulate such articles in a useful activity.

Broadly, the wheelchair attachment includes means for releasibly receiving an elongated handle of an article, and means, connected to the handle receiving means, for movably mounting the handle receiving means to at least one of a front vertical posts of a wheelchair.

In a first embodiment, the handle receiving means includes a first member, means, connected to the first member and pivotally attachable to one of the front vertical posts of a wheelchair, for pivotally mounting the first member to one front vertical post of a wheelchair, a second member mounted on one end of the first member, clamp means, mounted on the second member, for releasibly receiving an elongated handle of an article, and a handle mounted in the clamp means for user manipulation of the article. The second member is preferably rotatably mounted on the first member. Further, the clamp means includes two pivotally connected clamp portions, one mounted on the second member and one receiving the user manipulated handle means.

In a second embodiment, the handle receiving means comprises a pair of upper tubular members, each having opposed first and second ends. Means are mounted on the first ends of the upper tubular members for pivotally mounting each first end of the first and second members to one front vertical post of a wheelchair. A first means, attached to the second end of each of the upper tubular members and to an elongated handle of an article resiliently connects the handle of the article to the upper tubular member. The first means can be in the form of any suitable resilient member, such as a shock absorber having an extensible and retractable piston rod. Means are also provided for telescopingly and rotatably mounting each upper tubular member to one of the front vertical posts of a wheelchair.

In this embodiment, the attachment further includes a pair of lower beam members, each having opposed first and second ends. Means are provided for pivotally mounting the first end of each of the pair of lower beam members to a front vertical post of a wheelchair. Finally, means are mounted on the second end of each of the pair of lower beam members for securing each lower beam member to an article. A second means is attached to each upper tubular member and to each lower beam member for resiliently connecting one upper tubular member to one lower beam member.

In yet another embodiment, the wheelchair attachment includes a frame having first end portions. Means are provided for attaching each of the first end portions of the frame to the front vertical posts of a wheelchair. In this embodiment, the handle receiving means includes a support means for receiving a handle of an article, resilient means, connected to the support means and to the frame, for movably positioning the support means relative to the frame and clamp means for releasibly clamping another end of each of the plurality of coil springs to the frame. The resilient means preferably comprises a plurality of coil springs, each coil spring connected at one end to the support means.

The support means preferably includes a body having a bore sized to slidably receive an elongated first tubular member. One end of the first tubular member is telescopingly and pivotally mounted in a sleeve. Clamp means are provided for pivotally supporting the sleeve and for clamping the sleeve to an elongated handle of an article.

The wheelchair attachments of the present invention uniquely enable a wide variety of various articles, devices or machines, including implements, such as brooms, motor driven floor cleaning devices, floor buffers, etc., to be removably attached to a wheelchair in a position which enables the occupant of the wheelchair to easily manipulate the article to perform a useful activity. The wheelchair attachments are capable of receiving a wide variety of different articles. Further, the attachments support the articles, or at least the handle portion of such articles, in a manner which enables the occupant of a wheelchair to easily manipulate the article, even if the occupant has limited use of his or her arms and legs.

BRIEF DESCRIPTION OF THE DRAWING

The various features, advantages and other uses of the present invention will become more apparent by referring to the following drawings in which.

DESCRIPTION OF THE PREFERRED EMBODIMENTS

Figure 1:
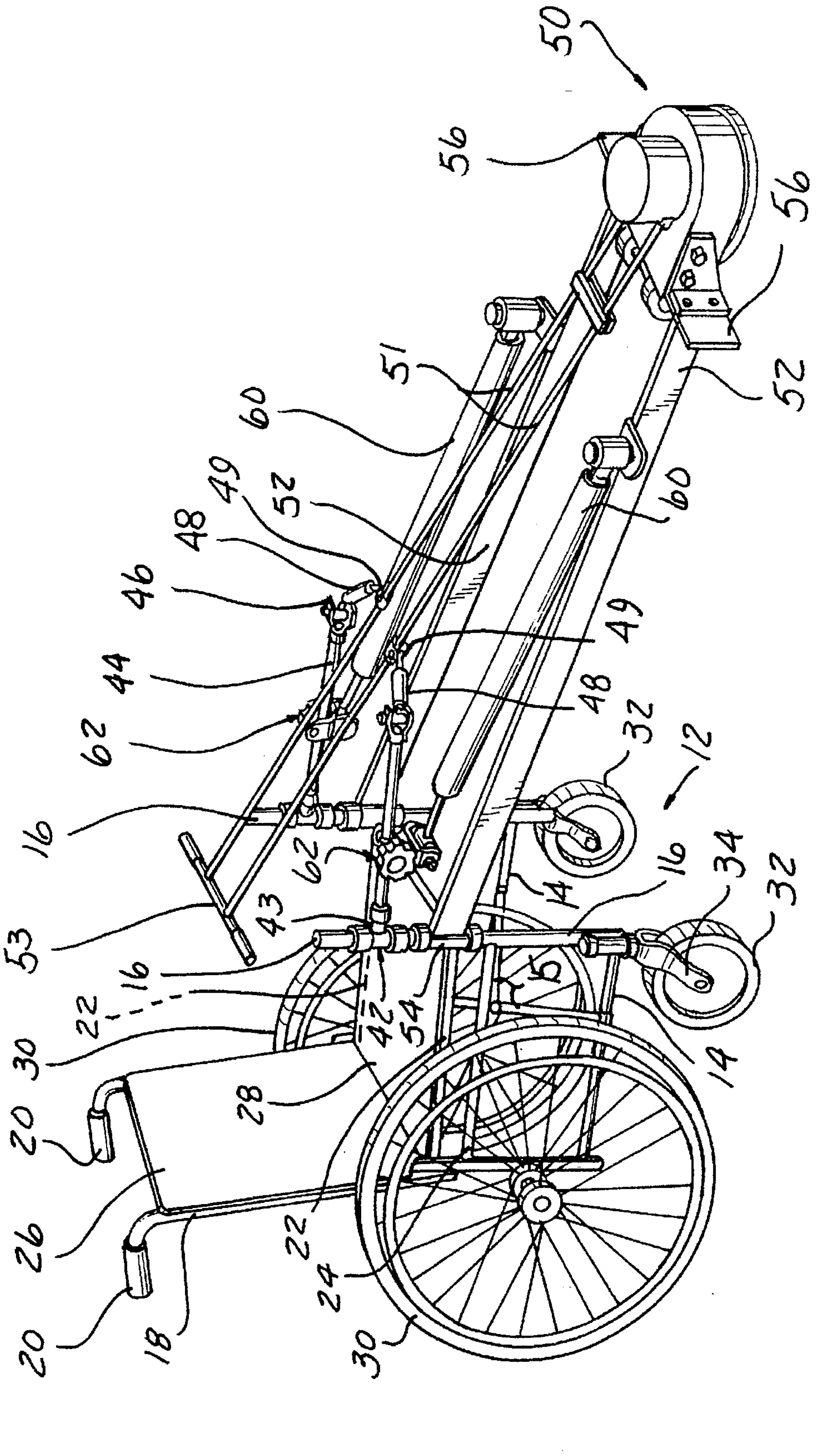
FIG. 1 is a perspective view of a first embodiment of the present invention showing a wheelchair attachment useful in removably attaching a floor cleaning device to a wheelchair.

In the following description of various attachments which are removably mounted to a wheelchair, it will be understood that the wheelchair shown in the drawings and described hereafter is by way of example only as any conventional wheelchair may be employed with the attachments of the present invention.

Thus, by way of example only, a wheelchair 10 is depicted in FIG. 1 as including a collapsible lower support frame 12 formed of lower horizontal members 14, a pair of front vertical posts 16 extending upwardly from one end of the horizontal members 14, a pair of rear vertical posts 18 which extend upwardly from an opposite end of the horizontal members 14 and terminate in a curved handle 20, and at least one and preferably a pair of spaced, horizontally extending upper supports 22 and 24. A pair of cross arms 15 extend diagonally between each lower horizontal member 14 and one upper support 24 and are pivotally connected at a center point. A seat back 26 and a seat bottom 28 are attached to the rear vertical posts 18 and the upper horizontal posts 22. Two large rear wheels 30 are attached by axles to the rear vertical posts 18. In addition, two smaller front wheels 32 are each mounted in a fork 34 which is rotatably attached to a support mounted on the lower end of each of the front vertical posts 16.

The upper ends of the front vertical posts 16 normally support an armrest, which has been removed in the present wheelchair 10.

Figure 2:
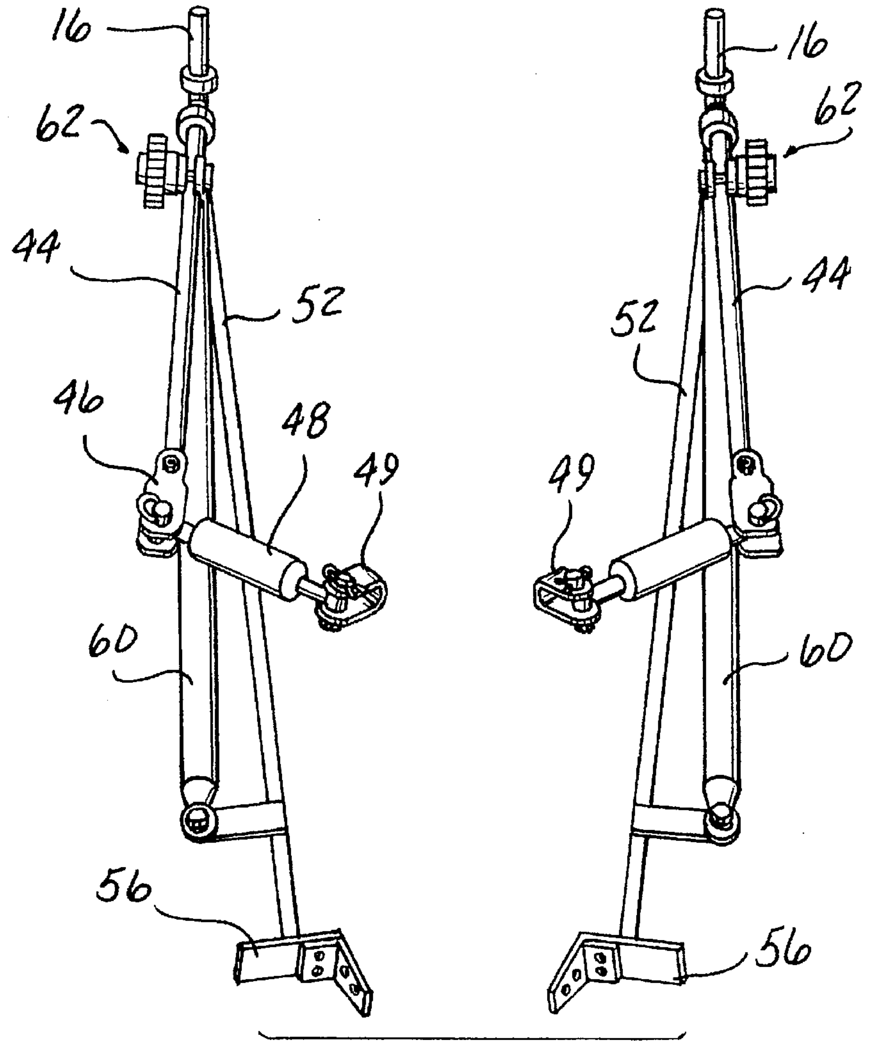
FIG. 2 is a plan, perspective view of the attachment shown in FIG. 1.

In a first embodiment of an attachment 40, shown in FIGS. 1 and 2, which is removably mounted on the wheelchair 10, the attachment 40 includes a pair of T-shaped tubular members 42 which are telescopingly mounted over the upper ends of each front vertical post 16 on the wheelchair 10. As the attachment 40 is symmetrical and includes opposed pairs of components, the following description will be provided with respect to the components on only one side of the attachment 40. Each T-shaped connector 42 includes a central leg 43 extending forward of the main body of the connector 42 which is telescopingly received within one end of an elongated upper tubular member 44. A collar is mounted on the leg 43 and acts as a stop for the upper tubular member 44. The outer end of the upper tubular member 44 has a fork 46 fixedly mounted at an opposite end. The fork 46 pivotally receives one end of a resilient or buffering member 48. In a preferred embodiment, the buffering member 48 is illustrated as being a shock absorber having one end connected to the fork 46 and another end connected to one handle of an attachment 50. The attachment 50, by way of example only, is depicted as being in the form of a conventional floor cleaning device or buffer having a handle in the form of a pair of elongated arms extending from a base to a crossbar 53. The buffer member or shock absorber 48 is capable of elongation and retraction to absorb vibrations generated during movement of the floor cleaning device 50.

The upper tubular member 44 is rotatably and telescopingly mounted over the central leg of the T-shaped connector 42 thereby permitting rotation and translation of the upper tubular member 44 with respect to the connector 46 and the wheelchair 10 during movement of the floor cleaning device 50.

A pair of beams 52 are mounted on each of the front vertical posts 16 of the wheelchair 10 by means of a cylindrical sleeve 54 fixed to one end of each beam 52 which is telescopingly mounted over the front vertical post 16 and held in position by means of opposed stops. Each of the beams 52 has an elongated shape with a mounting plate 56 securely attached, such as by welding, to an outer end thereof. The mounting plate 56 is shown in the form of an angle iron having apertures in one leg designed to be attached by fasteners to a suitable mounting support on the base of the floor cleaning device 50.

A lower resilient or buffer member 60 is extensibly connected between the one of each of the upper tubes 44 and one of the beams 52 as shown in FIGS. 1 and 2. Again, the lower buffer member 60 is depicted as being in the form of a shock absorber; although other buffer members, such as a coil spring, elastic band, etc., may also be employed to absorb vibrations generated during movement of the floor cleaning device 50 with respect to the wheelchair 10.

Each of the lower buffer members 60 is connected at one end to the one of upper tubes 44 by means of a double U-shaped clamp 62 which is secured at an upper end to the upper tubular member 44 and has a depending lower end which rotatingly receives one end of the piston rod of the shock absorber 60. The other end of each lower buffer member 60 is rotatingly connected to a post mounted on a plate fixed to a lower beam 52.

In use, the mounting plates 56 are connected to the supports on the base of the floor cleaning device 50. The upper buffer members 48 are attached at one end via the connectors 49 to the handles 51 of the floor cleaning device 50. One end of the cylindrical sleeve 54 of each lower beam 52 is then mounted over each front vertical post 16 on the wheelchair. The T-shaped connectors 42 are then telescopingly mounted over the upper ends of the front vertical posts 16 and secured in place by means of a collar or stop. This positions the upper crossbar 53 of the handle 51 of the floor cleaning device 50 in proximity with an occupant seated in the wheelchair 10 thereby enabling the occupant to move the floor cleaning device 50 about the floor in a conventional cleaning manner.

Figure 4:
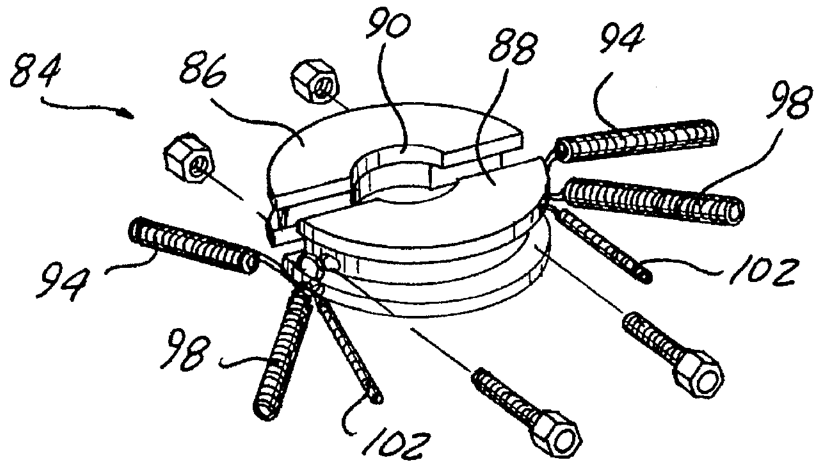
FIG. 4 is a perspective view of the article mounting means of the attachment shown in FIG. 3.
Figure 3:
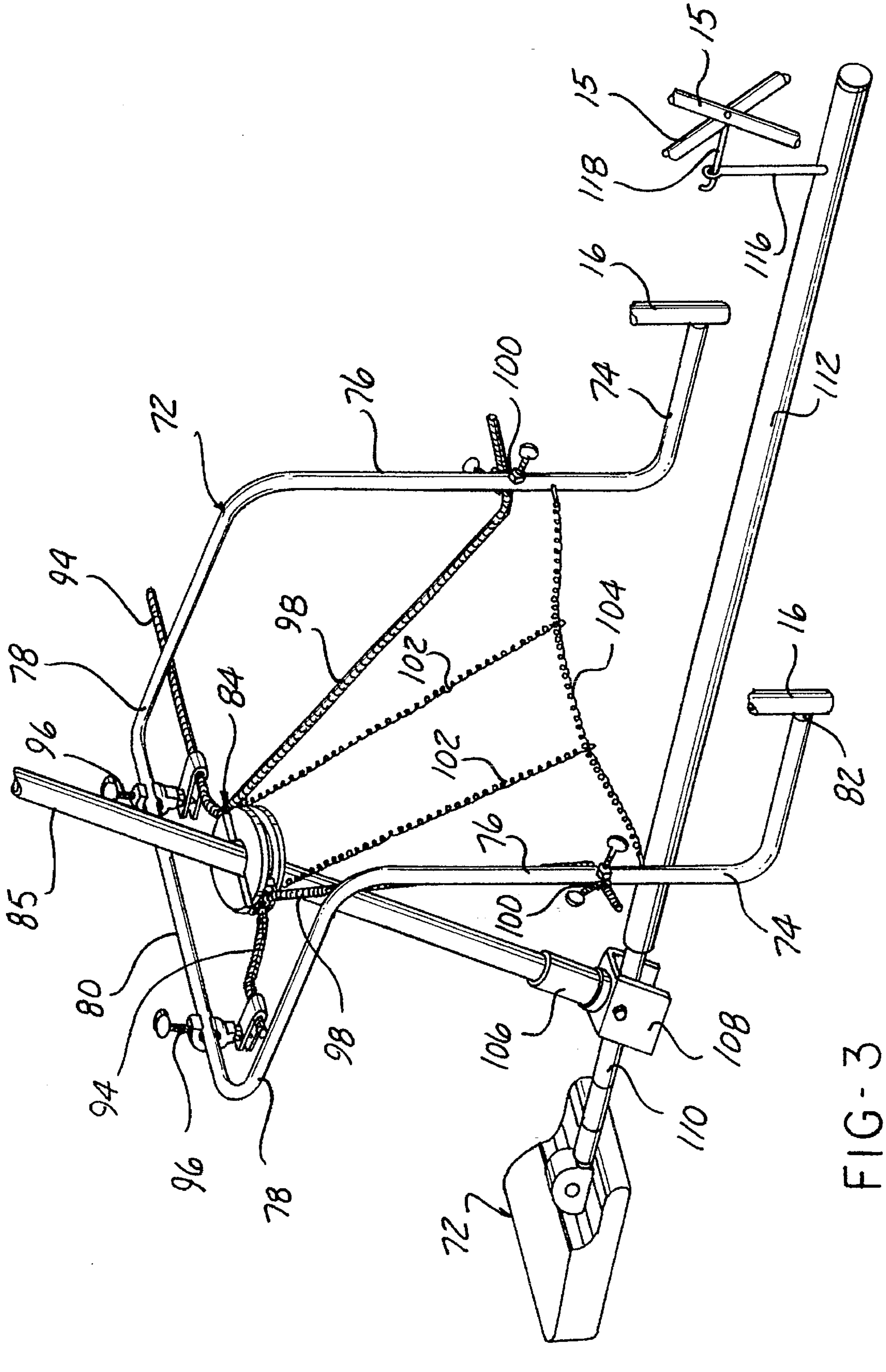
FIG. 3 is a perspective view of a second embodiment of a wheelchair attachment of the present invention.

Referring now to FIGS. 3 and 4, there is depicted a second embodiment of an attachment 70 which is useful in attaching various articles, devices or machines, such as a conventional vacuum cleaner 72, to the wheelchair 10. The vacuum cleaner 10 is described by way of example only as other devices, such as devices having an elongated handle, i.e., brooms, floor buffers, etc., may also be mounted in the attachment 70 and connected to the wheelchair 10.

In this embodiment, the attachment 70 includes a bent, tubular member 72 which has a pair of lower end portions 74, a pair of upright portions 76, a pair of side horizontally extending, upper portions 78 and a front cross bar 80. As shown in FIG. 3, the front cross bar 80 is positioned above the lower end portions 74.

The ends of each lower end portion 74 of the tubular member 72 are mounted in sleeves 82 fixedly mounted, such as by welding, to a lower end of each front vertical post 16 on the wheelchair 10. The lower end portions 74 extend forward of the front vertical post 16 such that the vertical portion 76, the forward extending horizontal side portion 78, and the cross bar 80 are positioned substantially in front of the lap of the occupant of the wheelchair 10.

A centering means 84 is provided for slidingly receiving and centering an elongated tubular rod 85 within the tubular member 72. The centering means 84, as shown in detail in FIG. 4, is in the form of a two-part bearing formed of mating halves 86 and 88 which are affixed together by means of bolts extending through aligned apertures in the halves 86 and 85. The mating halves 86 and 88 form a central aperture 90 therebetween, when joined together, for slidingly receiving the elongated tubular rod 85 therethrough. Each of the apertures in one of the halves 86 and 88 receives a hook formed on the end of one of a first pair of spring members 92 which are connected at another end to the front cross bar 80 by means of C-clamps 96. Each clamp 96 is releasibly attachable to the front cross bar 80 as shown in FIG. 3. A second pair of spring members 98 are hooked at one end to the springs 92 and at another end 84 to the vertically extending portions 76 of the tubular member 72 via a clamp 100.

A third pair of springs 102 extend from a connection at one end to the springs 92 and to a connection at another end to a cross spring 104 at another end. The cross spring 104 is connected at opposite ends to the tubular member 72, generally at the vicinity of the bend between the lower end portions 74 and the vertical portions 76 of the tubular member 72.

The elongated tubular rod or member 85 slidingly extends through the aperture 90 formed in the centering means 84 and is telescopingly mounted in a sleeve 106 pivotally and swivelably mounted on a U-clamp 108. The clamp 108 is releasibly connected to a conventional handle 110 pivotally connected at one end to a cleaning device, such as the base of the vacuum cleaner 72. The other end of the handle 110 is telescopingly received in an elongated, hollow tube 112. The opposite end of the tube 112 has an eyebolt 116 projecting upwardly therefrom. The eyebolt 116 engages a hook 118 mounted on and extending forwardly from the pivot joint between the cross members 15 on the wheelchair 10.

The telescoping arrangement of the handle 110 and the tubular member 112, as well as the elongated rod 85 and the tubular sleeve 106 enable manipulation of the rod 85 to be translated in any direction to movement of the cleaning device 72 including extension and retraction of the cleaning device 72 with respect to the wheelchair 10.

Figure 5:
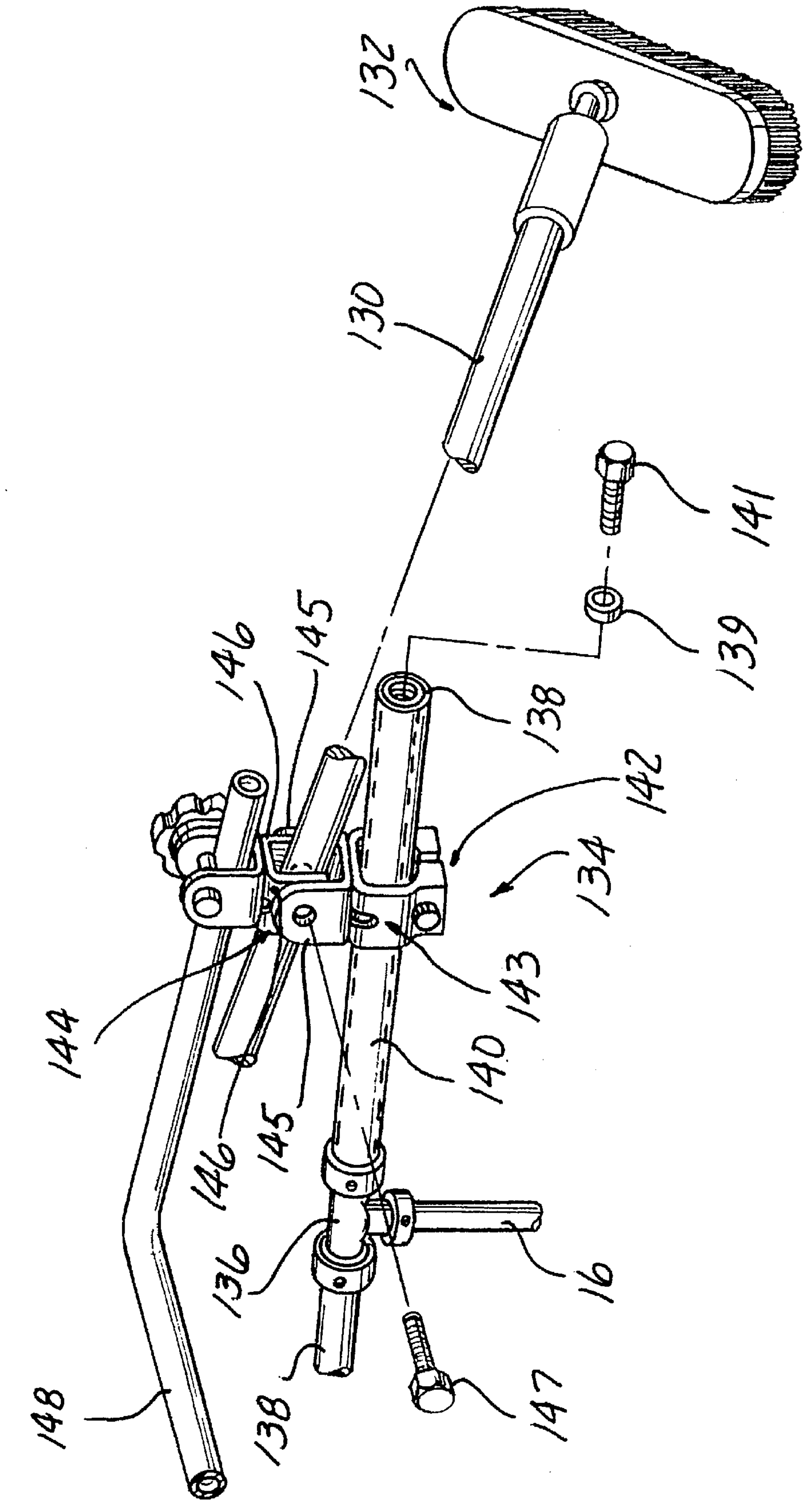
FIG. 5 is a perspective view showing a third embodiment of a wheelchair attachment of the present invention.

Referring now to FIG. 5, there is depicted a third embodiment of an attachment 134 which enables an elongated tubular rod or handle 130 of an article, such as a broom 132, to be fixedly attached to the wheelchair 10. The attachment 134 includes a T-shaped connector 136 which is pivotally mounted on an upper end of one of the front vertical posts 16 of the wheelchair 10. A support member or rod 138. The rod 138 extends through one leg of the T-shaped connector 136 and is co-axially mounted in a tubular member 140 for sliding movement of the tubular member 140 thereover. The outer end of the rod 138 is threaded and receives a washer 139 and a bolt 141 to retain the tubular member 140 on the rod 138.

A clamp 142 is formed of two pivotally connected clamp sections 143 and 144, each identical to the clamps 62 described above and shown in FIG. 1. One end of the clamp section 143 is fixedly mounted on the tubular member 140. The clamp section 143 also includes a pair of upstanding legs 145 which are pivotally connected to similar legs 146 on the clamp section 144 by a through bolt 147. The bolt 147 also passes through a bore formed in the handle 130 of an article, such as the broom 132, which passes through the spaced interconnected legs of the clamp sections 143 and 144. One end of a bent handle 148 is releasibly mounted in an end portion of the clamp section 144, with the other end of the handle 148 extending over the lap of the wheelchair occupant for easy grasping and manipulation by the occupant.

In this embodiment, the user by means of a single hand on the handle 148 can manipulate the broom 132 about the floor by pivoting the handle 148 and the upper clamp section 144 about the clamp section 143 and the tubular member 140, by left and right twisting movement of the handle 148 which rotates the tubular member 140 about the rod 138, and by sideways movement of the handle 148 which rotates the tubular member 140 and the rod 138 about the front vertical post 16 of the wheelchair.

In summary, there has been disclosed several embodiments of attachments which are releasibly attached to a conventional wheelchair and which releasibly receive various articles, devices or machines to permit the occupant of a wheelchair to manipulate such articles, devices or machines in a useful activity. The various attachments are capable of mounting a variety of different articles, devices or machines to the wheelchair and, at the same time, permit the occupant of the wheelchair to easily manipulate such articles, devices or machines by means of one or two hands thereby permitting such machines to be manipulated by a large number of wheelchair occupants who may have disabilities which limit their effective use of both hands and arms.

What is claimed is:

1. An attachment for a wheelchair having a frame including a pair of front vertical posts, for attaching an elongated handle of an article to the wheelchair, the attachment comprising:

means for releasibly receiving the elongated handle of the article; and means, connected to the handle receiving means, for movably mounting the handle receiving means to at least one front vertical post of the wheelchair;

the handle receiving means including:

a pair of upper tubular members, each having opposed first and second ends; and first means, attached to the second end of each of the upper tubular members and to the elongated handle of the article, for resiliently connecting the elongated handle of the article to the upper tubular member;

the mounting means pivotally mounting the first end of each of the upper tubular members to one vertical front post of the wheelchair.

2. The wheelchair attachment of claim 1 wherein:

the mounting means telescopingly and rotatably mounts each of the upper tubular members to one of the front vertical posts of the wheelchair.

3. The wheelchair attachment of claim 1 further comprising:

a pair of lower beam members, each having opposed first and second ends;

means for pivotally mounting the first end of each of the pair of lower beam members to one front vertical post of the wheelchair; and means, mounted on the second end of each of the pair of lower beam members, for securing each lower beam member to the article.

4. An attachment for a wheelchair having a frame including a pair of front vertical posts, for attaching an elongated handle of an article to the wheelchair, the attachment comprising:

means for releasibly receiving the elongated handle of the article, the handle receiving means including:

a pair of upper tubular members, each having opposed first and second ends; and first means, attached to the second end of each of the upper tubular members and to the elongated handle of the article, for resiliently connecting the elongated handle of the article to the upper tubular member, the first means including a shock absorber pivotally connected at one end to the upper tubular member and having an extensible and retractable piston rod attached to the handle of the article; and means, connected to the handle receiving means, for movably mounting the handle receiving means to at least one front vertical post of the wheelchair, the mounting means pivotally mounting the first end of each of the upper tubular members to one vertical front post of the wheelchair.

5. The attachment of claim 4 further comprising:

a pair of lower beam members, each having opposed first and second ends;

means for pivotally mounting the first end of each of the pair of lower beam members to one front vertical post of the wheelchair; and means, mounted on the second end of each of the pair of lower beam members, for securing each lower beam member to the article.

6. The attachment of claim 5 further comprising:

second means, coupled between the upper tubular members and the pair of lower beam members, for resiliently connecting each lower beam member to one upper tubular member.

7. The attachment of claim 6 wherein the second means comprises:

a shock absorber pivotally connected to one lower beam member and to one of the upper tubular members.

8. An attachment for a wheelchair having a frame including a pair of front vertical posts, for attaching an elongated handle of an article to the wheelchair, the attachment comprising:

means for releasable receiving the elongated handle of the article;

means, connected to the handle receiving means, for movably mounting the handle receiving means to at least one front vertical post of the wheelchair;

a pair of lower beam members, each having opposed first and second ends;

means for pivotally mounting the first end of each of the pair of lower beam members to one front vertical post of the wheelchair;

means, mounted on the second end of each of the pair of lower beam members, for securing each lower beam member to the article; and means, coupled between the handle receiving means and the pair of lower beam members, for resiliently connecting each lower beam member to the handle receiving means.

9. The wheelchair attachment of claim 8 wherein the second means comprises:

a shock absorber pivotally connected to one lower beam member and to the handle receiving means.

10. An attachment for a wheelchair having a frame including a pair of front vertical posts, for attaching an elongated handle of an article to the wheelchair, the attachment comprising;

means for releasibly receiving the elongated handle of the article;

means, connected to the handle receiving means, for movably mounting the handle receiving means to at least one front vertical post of the wheelchair; and the handle receiving means including, a pair of upper tubular members, each having opposed first and second ends;

the mounting means pivotally mounting the first end of each of the upper tubular members to one vertical front post of the wheelchair;

a pair of lower beam members, each having opposed first and second ends;

means for pivotally mounting the first end of each of the pair of lower beam members to one front vertical post of the wheelchair; and means, mounted on the second end of each of the pair of lower beam members, for securing each lower beam member to the article.

* * * * *